United States Patent [19]
Jacanin, Jr. et al.
[11] Patent Number: 4,878,704
[45] Date of Patent: Nov. 7, 1989

[54] CONVERTIBLE SNOW CLEARING APPARATUS

[76] Inventors: James M. Jacanin, Jr., 4637 Briarpatch Ct., Fairfax, Va. 22032; Christopher H. Cardiff, 9020 Southwick St., Fairfax, Va. 22031

[21] Appl. No.: 187,984

[22] Filed: Apr. 29, 1988

[51] Int. Cl.[4] .......... A01B 1/22; E01H 5/02

[52] U.S. Cl. .......... 294/54.5; 37/241; 37/285; 294/51; 294/59

[58] Field of Search .......... 294/49, 51, 52, 54.5, 294/55-59; 37/118 R, 122, 124, 125, 127, 130, 131, 135, 137, 216, 241, 265, 266, 274, 278, 281, 284, 285, DIGS. 3, 12

[56] References Cited

U.S. PATENT DOCUMENTS

| | | | |
|---|---|---|---|
| 1,049,812 | 1/1913 | Darling | 37/241 X |
| 1,375,505 | 4/1921 | Grady | 37/284 |
| 1,678,135 | 7/1928 | Crosman et al. | 37/265 |
| 1,746,859 | 2/1930 | Hurd | 37/274 X |
| 1,888,170 | 11/1932 | Hornbaker . | |
| 1,956,295 | 4/1934 | Lindgren | 37/284 |
| 2,014,783 | 9/1935 | Schubert | 37/274 X |
| 2,460,560 | 2/1949 | Williams | 37/278 |
| 2,826,835 | 3/1958 | O'Shea . | |
| 3,023,021 | 2/1962 | Fricke et al. | 37/241 X |
| 3,024,547 | 3/1962 | Harrison . | |
| 3,380,772 | 4/1968 | Lissakers | 37/265 |
| 4,103,954 | 8/1978 | Vaslas . | |
| 4,531,713 | 7/1985 | Balboni . | |
| 4,669,206 | 6/1987 | Yost . | |

FOREIGN PATENT DOCUMENTS

| | | | |
|---|---|---|---|
| 1925575 | 11/1970 | Fed. Rep. of Germany | 37/130 |
| 1311976 | 1/1962 | France | 37/265 |
| 166128 | 3/1934 | Switzerland | 37/266 |
| 417321 | 10/1934 | United Kingdom | 37/278 |

*Primary Examiner*—Johnny D. Cherry
*Attorney, Agent, or Firm*—Kerkam, Stowell, Kondracki & Clarke

[57] ABSTRACT

Convertible snow clearing apparatus provides a wide blade double handle snow pusher which may be used as a plow for pushing snow, and which is easily converted into a pair of individual snow shovels. The apparatus includes an intermediate blade member for connecting the blades of two standard snow shovels in side-to-side parallel relationship and a cross bracing member connected to the handles for maintaining the handles in spaced apart parallel relationship. The intermediate blade member and the cross bracing member are detachably connected to the blades and to the handles, respectively, using quick-release connectors.

18 Claims, 2 Drawing Sheets

FIG 1
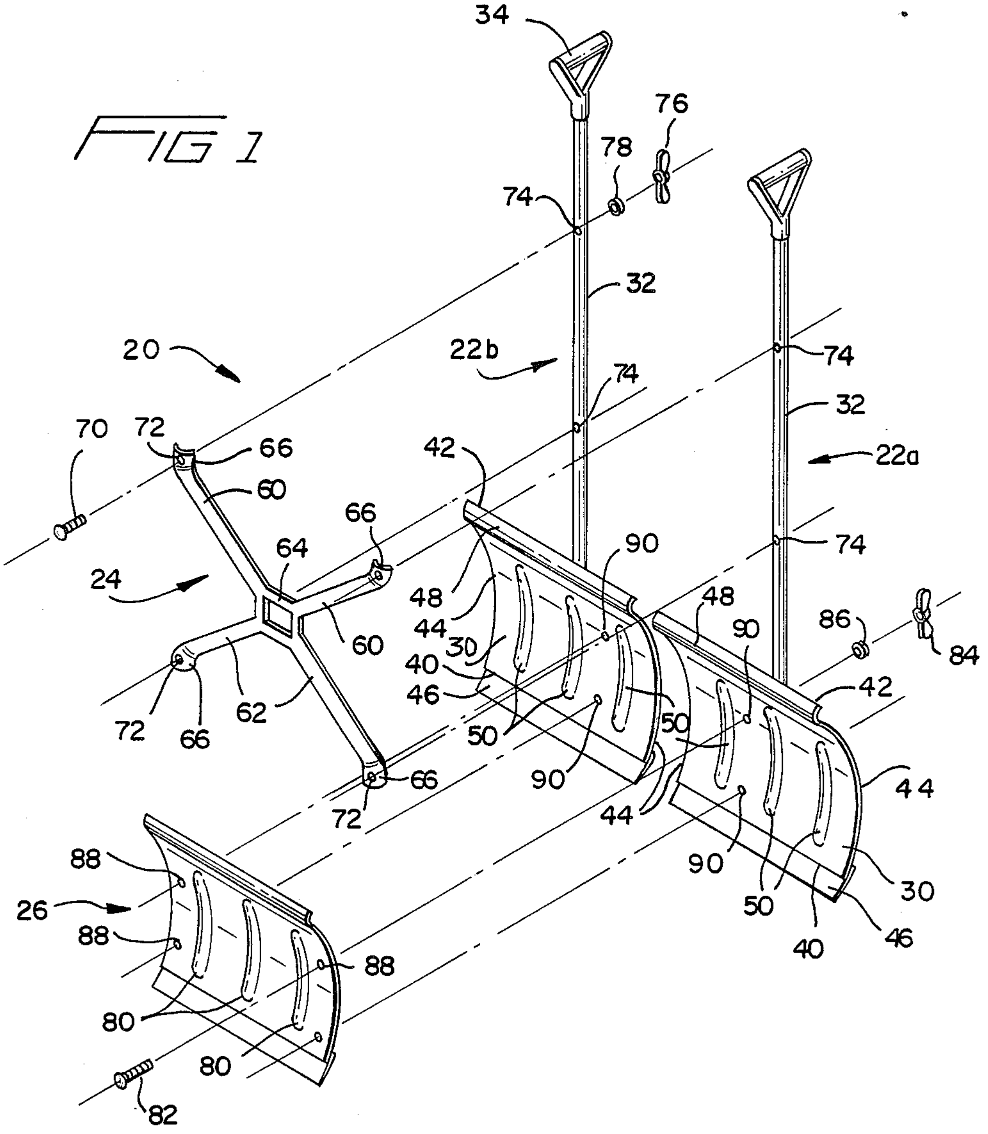
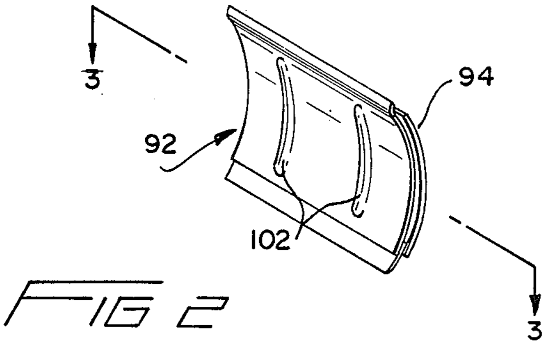
FIG 2
FIG 3
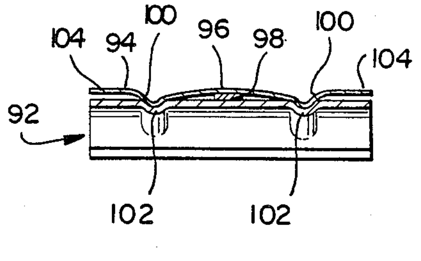

CONVERTIBLE SNOW CLEARING APPARATUS

BACKGROUND OF THE INVENTION

The present invention relates generally to snow clearing implements such as snow shovels and the like, and more particularly to improved snow clearing apparatus which may be used as a snow pusher or plow and which is readily convertible for shoveling operations such as scooping, lifting and tossing snow.

Clearing and removing snow manually from walkways and driveways is typically a demanding, time-consuming, and laborious task. This is particularly true when the snow is wet and heavy since considerable effort may be required to lift a snow-ladened shovel full of wet snow and toss it to the side. It is often easier to clear an area by using a snow shovel as a snow pusher or plow to push the snow off to the side. In this case, the user typically pushes the shovel along the ground while walking and holding the shovel, generally with both hands, by the hand grip attached to the end of the handle. As the volume of snow in front of the blade increases, the shovel becomes more difficult to push, and this technique is satisfactory as long as the user is able to exert sufficient leverage through the handle to move the blade across the ground. Although pushing snow is generally easier than lifting and tossing it, the time required to clear a given area by pushing may not be substantially different from shoveling. Usually, in pushing, snow spills past the sides of the blade into an already cleared area, necessitating another pass over the cleared area to remove the spill-over.

Many different types of snow shovels and snow pushers are known. These include shovels, in addition to a conventional straight-handle shovel, having a bent handle to ease back strain or having an auxiliary handle connected to a main handle to reduce the effort required to lift the shovel when it is full of snow, and include different types of snow pushers. Most known snow pushers are not very efficient and usually are somewhat limited in their capabilities. While shovels may be used as snow pushers, they are generally not optimum for this purpose, and a device which is designed to be a snow pusher is generally not well suited for shoveling involving lifting and tossing of snow. Also, a person owning a snow pusher usually must also have a snow shovel since there are many areas where a pusher may be unsatisfactory. Likewise, a snow shovel owner may wish to have a separate snow pusher. Thus, in each case it may be necessary to have two separate devices. This is disadvantageous.

Despite the plethora of different types of snow clearing implements, present devices still have well-known limitations, such as pointed out above. There is a need for improved snow clearing apparatus which overcomes these limitations and which eases the burden and time required to clear snow. The present invention is directed to these ends.

SUMMARY OF THE INVENTION

It is a principal object of the invention to provide snow clearing apparatus which avoids the foregoing and other limitations of known apparatus by providing, in a single device, snow clearing apparatus which is versatile and which functions efficiently and optimally both as a snow pusher and as a snow shovel.

Other objectives of the invention include providing snow clearing apparatus which enables the time required for clearing an area of snow to be reduced; is easy and convenient to use; is economical to manufacture; and which can be easily produced using a variety of readily available standard devices.

Advantageously, these objectives are accomplished by the present invention in snow clearing apparatus which is easily convertible from a wide blade double handle snow pushing plow-type device to a pair of individual snow shovels. When used as a snow pusher, the wide blade enables a wider path to be cleared of snow on each pass of the apparatus over an area, thereby enabling the area to be cleared more rapidly. The double handle arrangement, aside from being more comfortable for a user, permits more leverage to be applied to the apparatus and a larger volume of snow to be moved easily. The double handle arrangement also affords better control and facilitates guiding of the apparatus over the ground. When the need or desire for shovels arises, the apparatus is readily convertible into two separate snow shovels which may be used in a conventional manner by different users.

Broadly stated, in one aspect, the invention provides snow clearing apparatus comprising blade means for pushing snow, first and second handles each having one end connected to the blade means and the handles being transversely spaced approximately shoulder width apart, cross bracing means connected to the handles for holding the handles in spaced relationship, and first and second hand grips connected to opposite ends of the handles to enable pushing of the blade means, thereby enabling the apparatus to be used as a snow pusher. The blade means is substantially rectangular in front profile and has a predetermined transverse width which is greater than the spacing between the first and second handles so that the blade means extends transversely beyond each handle.

In another aspect, the invention provides snow clearing apparatus comprising first and second snow-working blades; first and second handles, each having one end secured to a respective one of the blades and a second end with a hand grip secured thereto; means for connecting the first and second blades together in parallel relationship so as to form a wide blade; and cross bracing means connected to the handles for holding the handles in spaced relationship with the hand grips positioned to enable the apparatus to be used for pushing snow; the connecting means and the cross bracing means being detachably connected to the blades and to the handles, respectively, to enable the blades and their associated handles and hand grips to be separated and used In yet another aspect, the invention provides snow clearing apparatus comprising a pair of snow shovels, each having a snow-working blade, a handle having one end connected to the blade, and a hand grip connected to another end of the handle; means for connecting the blades of the shovels together to form a wide shovel blade; and cross bracing means connected to the handles for holding the handles in spaced relationship to enable the apparatus to be used for pushing snow; the connecting means and the cross bracing means being detachably connected to the blades and the handles, respectively, so as to enable the shovels to be separated and individually used.

In other aspects, the blades may have any convenient shape desired, either flat or curved, and the handles may similarly have any desired shape, either straight or bent.

Advantageously, the invention may employ any of a large variety of different types of snow shovels which are available. Preferably, quick disconnect type connections are employed for connecting the blades and the handles together so that the apparatus may be easily and quickly converted from a snow pusher to a pair of shovels and back to a snow pusher again, as desired.

BRIEF DESCRIPTION OF THE DRAWINGS

FIG. 1 is an exploded perspective view of a preferred form of a first embodiment of the invention;

FIG. 2 is a perspective view of an alternative form of an intermediate blade member which may be employed in the apparatus of FIG. 1;

FIG. 3 is a cross sectional view of the intermediate blade member of FIG. 2 taken approximately along the lines 3—3;

DESCRIPTION OF PREFERRED EMBODIMENTS

Figure 5:
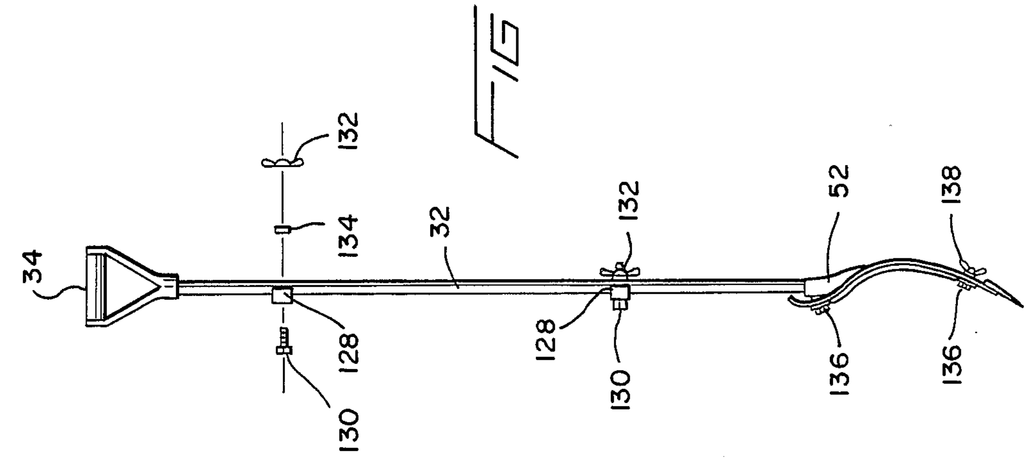
FIG. 5 is a side view of the apparatus of FIG. 4.

The invention is especially well adapted for use in clearing and removing snow, and will be described in that context. It will become apparent, however, that this is illustrative of only one utility of the invention.

FIG. 1 illustrates a first embodiment of convertible snow clearing apparatus 20 in accordance with the invention. As shown in the figure, the apparatus may generally comprise a pair of snow shovels 22*a* and 22*b*, a cross brace 24, and an intermediate blade member 26. Shovels 22*a* and 22*b* each may comprise a snow-working blade 30, a handle 32 connected to the blade, and a hand grip 34 connected to the handle. The shovels may be conventional snow shovels and may be substantially identical, although this is not necessary. The shovels are adapted to be connected together by the cross brace 24 and the intermediate blade member 26, as indicated in the figure, to form a rigid wide blade structure. As will be described in more detail shortly, when so connected the apparatus may be used as a plow for pushing snow. As will also be described in more detail shortly, the shovels are preferably detachably connected together using quick release disconnect connections so that the apparatus may be quickly and easily converted from a pusher to two individual shovels, each of which may be used for shoveling snow, and converted back again to a pusher as desired.

As shown in the figure, blade 30 of each shovel may be substantially rectangular (in front profile), having a lower edge 40, a top edge 42 and opposite side edges 44. The lower edge of the blade may be provided with a conventional wear element 46, such as a steel plow edge, which forms a groundengaging bottom edge of the blade. In the form illustrated in the figures, the blade may have a forwardly concave shape (in side profile), curving rearwardly and upwardly from the bottom edge to a region 48 adjacent to the top edge 42 of the blade. In region 48, the blade may become forwardly convex and curve sharply to the rear along a line generally parallel to the top edge, as shown. This upper rearward curve adds rigidity and dimensional stability to the blade and assists the blade in resisting twisting moments caused by forces applied to the blade during use which would otherwise cause the blade to twist out of shape. As best illustrated in the side view of FIG. 5, the blade may have a generally C-shaped configuration in a plane normal to the major surfaces (front and rear faces) of the blade. In order to afford additional strength and dimensional stability, the blade may also be provided with a plurality of elongated, vertically extending forwardly convex deformations 50, as shown.

Blade 30 may be formed in a conventional manner of sheet metal or metal plate, as of aluminum or steel, or of plastic. For use as a snow pusher, the blade preferably has a C-shaped configuration such as shown in the drawings since this configuration tends to direct snow upwardly along the front face and deposit it in front of the blade as the blade is pushed through the snow. However, a blade of any other configuration, either flat, angled, or curved, may also be used.

Shovel handle 32 may have one end (the lower end in the figures) secured to the rear face of the blade, as by a bracket 52 (see FIG. 5) which provides a socket for the handle. The bracket may be secured to the rear face of the blade in a conventional manner, as by spot welding or rivets, for example, and the end of the handle received in the socket may be secured therein, also in a conventional manner. The handle may be straight, as shown in the figures, or it may be bent or angled as, for example, the handles of snow shovels which are designed to reduce back strain. The handle may be of wood, tubular metal, or plastic composite material. Hand grip 34 may be a conventional hand grip of either metal or plastic which is secured to the opposite end of the handle. Preferably, the hand grip is oriented on the handle in the manner illustrated in the figures so that it lies in a plane which is normal to the faces of the blade. Thus, during use of the apparatus as a pusher, the portion of the hand grip held by the user will be pointed generally upward and outward rather than transverse to the user's body as is usually the case with conventional shovels. The hand grip orientation shown is more convenient for enabling the apparatus to be used as a snow pusher and is quite satisfactory for using the shovel as a shovel. If desired, the apparatus may be formed with a releasable two-position locking mechanism such that the hand grips may be rotated 90° from the positions shown and locked in place.

As shown in FIG. 1, cross brace 24 is connected to the handles of the two shovels 22*a* and 22*b* when the apparatus is configured as a snow pusher. It serves to hold the handles securely in spaced apart relationship and adds rigidity to the structure. As shown in the figure, the cross brace may be X-shaped, providing a pair of upper arms 60 and a pair of lower arms 62 connected together in a central region 64. The cross brace is preferably formed of metal strip or tubing with the end of each arm configured as a semi-cylindrical flange 66 shaped to conform to the handles. This facilitates connection of the cross brace to the handles at the end of each arm.

Preferably, the cross brace is detachably connected to the handles using quick release or quick disconnect connecting means. As shown in the figure, this may be accomplished using bolts 70 which extend through holes 72 in the flanges and corresponding holes 74 in the handles, and wing nuts 76 (only one bolt and wing nut are illustrated in FIG. 1 to avoid cluttering the figure). In addition, a washer 78 may be used to provide a bearing surface against the handle for the wing nut. When the wing nuts are tightened on the bolts, the semi-cylindrical flanges 66 of the end members are pulled into tight conforming engagement with the handles and assist in imparting rigidity to the structure. The bolts and wing nuts are advantageous in enabling the cross brace to be quickly and easily connected to and disconnected from the handles, and afford good rigidity and strength to the apparatus. However, other types of clamps or quick-disconnect couplings may also be employed. Naturally, when the cross brace is disconnected and removed, it is desirable to thread the washers and wing nuts onto the bolts extending through holes 72 to prevent inadvertent loss.

Intermediate blade member 26 is adapted to connect the blades 30 of the two shovels together in spaced side-by-side parallel relationship to one another, as indicated in the figure, to form, in effect, one wide snow-pushing blade. As shown, intermediate blade member 26 may be formed to have the same shape and size as the shovel blades so that it conforms to the shovel blades and lays flat against the blades when connected to them. The width of the intermediate blade member may be such that it overlaps a portion of each of the adjacent shovel blades, as shown, and the member may be formed with elongated vertically extending forwardly convex deformations 80. The deformations form corresponding depressions in the rear face of the intermediate number and are sized and positioned to receive corresponding deformations 50 of the blades. This enables the intermediate blade member to lie flat against the two shovel blades with the projecting deformations 50 on the front faces of the blades received in the rear face depressions 80 of the intermediate member. This assists in locking the blades and blade member together in parallel relationship and in providing rigidity to the combined blade structure.

The intermediate blade member may be connected to the shovel blades using bolts 82, wing nuts 84 and washers 86 (only one bolt, wing nut and washer being shown in the figure) in a manner similar to that described for the cross brace with the bolts extending through holes 88 in the intermediate blade member and corresponding holes 90 in the shovel blades. As with the cross brace, this arrangement detachably connects the intermediate blade member to the two shovel blades in a manner which allows it to be quickly disconnected.

As indicated in FIG. 1, intermediate blade member 26 and cross brace 24 may be sized such that when the two shovels are connected together the shovel blades are slightly spaced apart. Preferably, the intermediate blade member and the cross brace are dimensioned such that the handles of the shovels are approximately shoulder width apart, for example, 18 to 24 inches. This provides a comfortable and convenient location for the two hand grips and enables the user to push the apparatus with his or her arms extending generally directly outwardly from the body. This spacing also facilitates control and guiding of the apparatus as it is being pushed. The orientation of the hand grips normal to the blades is more comfortable for using the apparatus as a pusher than if the hand grips were turned ninety degrees parallel to the blades, as previously described.

As may be appreciated from the foregoing, with the apparatus configured as a snow pusher, it affords a rather wide snow-pushing blade which enables a larger path to be cleared on each pass over an area. The double handle arrangement enables the apparatus to be pushed using both arms so that greater leverage can be applied, and enables a rather large volume of snow to be pushed easily. Using the invention, it has been found that a given area may be cleared of snow much more quickly and easily than is possible using a conventional shovel.

FIGS. 2 and 3 illustrate another form of an intermediate blade member 92 which may be used instead of blade member 26 in the apparatus of FIG. 1. Intermediate blade member 92 may have the same shape and size as blade member 26, but it embodies a different quick-release connection mechanism. As shown, the rear face of the intermediate blade member 92 may be provided with a resilient clamp or spring member 94, as of spring steel, comprising a contoured plate which is shaped to conform to the rear face. As shown in FIG. 3, the clamp member may be secured at its midpoint 96 to a spacer 98 on the rear face, and may be bowed somewhat rearwardly, as shown, in order to bias portions of the member into engagement with the rear face. The clamp member may be formed to have rounded forward projections 100 which conform to and enter corresponding depressions formed by elongated vertically orientated deformations 102 of the blade member, as shown. The clamp member may be shaped such that its ends 104 are spaced rearwardly from the rear face. This construction enables the shovel blades to be slid sideways into the spaces between the clamp member and the rear face of the intermediate blade member until deformations 50 of the blades are positioned in the depressions formed by deformations 102 in the rear face of intermediate blade member. Projections 100 of the clamp member are biased into engagement with the depressions in the rear faces of the blades formed by the deformations 50 and bear against the blades to hold the blades locked in position with the intermediate clamp member.

The clamping arrangement illustrated in FIGS. 2 and 3 is more advantageous than bolts and wing nuts for connecting the intermediate blade member to the shovel blades since it enables the blades to be simply slipped into the intermediate member and snapped into place. When the cross brace is then connected to the handles, it provides sufficient rigidity to hold the structure together and prevent the blades from slipping out of the intermediate blade member.

Figure 4:
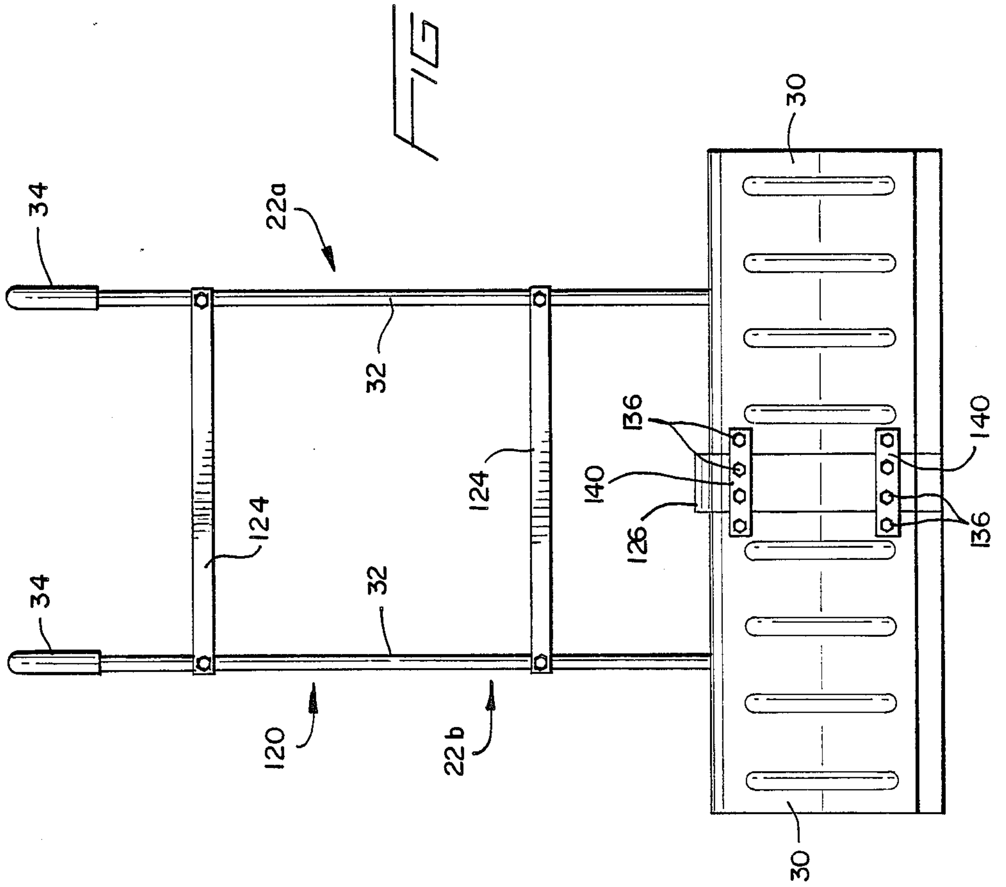
FIG. 4 is an elevational view of another embodiment of the invention, this view illustrating a different form of cross brace and a different form of an intermediate blade member.

FIGS. 4 and 5 illustrate another embodiment 120 of the invention which is somewhat similar to that of FIG. 1 except that it employs different mechanisms for cross bracing the handles and for connecting the blades together. As shown, instead of an X-shaped cross brace, the apparatus may employ one or more straight bracing members 124, as of metal tubing, for connecting the handles 32 of the shovels *22a* and *22b* together and a blade member 126 for connecting the blades 30 together. Although one straight cross bracing member 124 may be employed, it is preferable to use at least two, as shown, one near the upper ends of the handles and one in the lower portion of the handles near the blades. The ends of the cross bracing members may be curved, as indicated at 128 in FIG. 5, so that they wrap partially around the handles. The cross bracing members may be detachably connected to the handles in a manner similar to that previously described for cross brace 24 using bolts 130, wing nuts 132, and washers 134, as illustrated.

As shown in FIG. 4, blade member 126 may be sized to fit in the space between the adjacent blades 30 and may be connected to the blades by bolts 136, wing nuts 138, and transverse cross straps 140, as shown. Blade member 126 is preferably shaped to match the shape of the blades so that when it is connected to the blades the resulting wide blade of the apparatus has a generally continuous surface.

The embodiment of FIGS. 4 and 5 provides similar advantages to the embodiment of FIG. 1 in that it provides a wide snow-pushing blade and is readily convertible from a snow-pushing apparatus to individual shovels.

While the invention is particularly advantageous when formed as described above to be convertible between a snow pusher and shovels, many of the advantages of the invention may also be attained by an apparatus which is not convertible and which comprises one single wide blade with two spaced handles for use as a snow pusher only.

While preferred embodiments of the invention have been shown and described, it will be appreciated by those skilled in the art that changes may be made in these embodiments without departing from the principles and the spirit of the invention, the scope of which is defined in the appended claims.

We claim:

1. Snow clearing apparatus comprising first and second blades for pushing snow, and first means for detachably connecting the first and second blades together in side-to-side relationship to form a wide blade and so as to enable the first and second blades to be detached and separated, the wide blade being substantially rectangular in front profile and having a predetermined transverse width; first and second handles, each handle having one end connected to a respective one of the first and second blades, the handles being transversely spaced such that the predetermined transverse width of the wide blade is greater than the spacing between the handles and such that the wide blade extends transversely beyond each handle; cross bracing means for holding the handles in spaced relationship; second means for detachably connecting the cross bracing means to the handles, and first and second hand grips respectively secured to another end of the first and second handles to enable a user to push the blades across the ground, the first and second detachably connecting means enabling the apparatus to be converted to first and second snow shovels, each shovel comprising one of the blades and one of the handles.

2. The apparatus of claim 1, wherein the first means for detachably connecting the first and second blades together comprises an intermediate blade member shaped to conform to the first and second blades and to hold the first and second blades spaced in said side-to-side relationship to form said wide blade.

3. The apparatus of claim 2, wherein said first and second detachably connecting means comprise nuts and bolts for connecting the intermediate blade member to the first and second blades and for connecting the cross bracing means to the handles.

4. The apparatus of claim 2, wherein the intermediate blade member has a spring plate connected to a rear surface of the intermediate blade member, the spring plate being formed such that portions of the spring plate are biased into engagement with the rear surface and such that opposite sides of the spring plate are spaced from the rear surface to enable the first and second blades to be inserted between the spring plate and the rear surface and to be engaged by the portions of the spring plate which are biased into engagement with the rear surface.

5. The apparatus of claim 4, wherein the first and second blades are each formed with an elongated vertically extending deformation in a region of the blade which is inserted between the spring plate and rear surface, and wherein the intermediate blade member is provided with depressions in the rear surface for receiving said deformations to assist in holding the blades connected to the intermediate blade member.

6. The apparatus of claim 1, wherein the cross bracing means comprises an X-shaped member having upper arms and lower arms which are connected to the handles.

7. The apparatus of claim 1, wherein the cross bracing means comprises first and second members extending transversely between the handles and being respectively connected to the handles at an upper region and at a lower region thereof.

8. The apparatus of claim 1, wherein the hand grips are oriented on the handles such that they are substantially normal to the blade wide.

9. Snow clearing apparatus comprising first and second snow-working blades; first and second handles, each having one end secured to a respective one of the blades and a second end with a hand grip secured thereto; means for connecting the first and second blades together in side-to-side relationship so as to form a wide blade; and cross bracing means connected between the handles for holding the handles in spaced relationship with the hand grips positioned to enable the apparatus to be used for pushing snow; the connecting means and the cross bracing means being detachably connected to the blades and to the handles, respectively, to enable the blades and their associated handles to be separated and used individually as shovels.

10. The apparatus of claim 9, wherein the connecting means comprises an intermediate blade member shaped to conform to the first and second blades and sized to overlap and connect the first and second blades in said side-to-side relationship to form said wide blade, and quick release connectors for connecting the intermediate blade member to the first and second blades.

11. The apparatus of claim10, wherein the first and second blades are each provided in a region of the blade overlapped by the intermediate blade member with an elongated vertically extending forwardly projecting deformation, and the intermediate blade member is provided with corresponding depressions for receiving the deformations to enable the intermediate blade member to lie flat against the blades.

12. The apparatus of claim 11, wherein the quick release connectors comprise portions of a spring member connected to the intermediate blade member, which portions engage the first and second blades to connect the intermediate blade member to the first and second blades.

13. The apparatus of claim 9, wherein the cross bracing means comprises an X-shaped member having upper and lower arms, the ends of which arms are connected to the handles, the X-shaped member being sized to hold the handles in a predetermined spaced relationship.

14. The apparatus of claim 9, wherein the hand grips are oriented substantially normal to the first and second blades.

15. Snow clearing apparatus comprising a pair of snow shovels, each having a snow-working blade, a handle having one end connected to the blade, and a hand grip connected to another end of the handle; means for connecting the blades of the shovels together to form a wide shovel blade; and cross bracing means connected to the handles for holding the handles in spaced relationship to enable the apparatus to be used for pushing snow; the connecting means and the cross bracing means being detachably connected to the blades and to the handles, respectively, so as to enable the shovels to be separated and individually used.

16. The apparatus of claim 15, wherein the blades each comprise a generally rectangular sheet of material formed to curve upwardly from a ground-engaging bottom edge of the blade so as to impart to the blade a forwardly concave shape, and wherein the connecting means comprises an intermediate blade member having a similar curvature to that of the blades and which is sized to overlap the blades upon the blades being placed in spaced side-to-side relationship, and spring means on the intermediate blade member for engaging the blades in regions overlapped by the intermediate blade member so as to connect the intermediate blade member to the blades.

17. The apparatus of claim 15 wherein the connecting means and the cross bracing means are sized such that the handles of the shovels are spaced a predetermined width apart, and wherein the hand grips on the handles are oriented such that they are substantially normal to the blades.

18. The apparatus of claim 15, wherein the connecting means comprises an intermediate blade member sized to be inserted between the blades when the blades are in spaced side-to-side relationship, the intermediate blade member having cross straps thereon which extend beyond sides of the intermediate blade member and overlap the blades, and means for connecting the cross straps to the blades to form said wide shovel blade.

* * * * *

UNITED STATES PATENT AND TRADEMARK OFFICE

CERTIFICATE OF CORRECTION

PATENT NO. : 4,878,704

DATED : November 7, 1989

INVENTOR(S) : Jacanin, Jr., et al

It is certified that error appears in the above-identified patent and that said Letters Patent is hereby corrected as shown below:

In Col. 8, claim 8, line 16 "blade wide" should be --wide blade--.

Signed and Sealed this

Twenty-fifth Day of December, 1990

*Attest:*

HARRY F. MANBECK, JR.

*Attesting Officer* — *Commissioner of Patents and Trademarks*